United States Patent
Sato et al.

[15] 3,686,466

[45] Aug. 22, 1972

[54] EASILY ENGAGEABLE MAGNETIC HEAD WITH VISIBLE GAP ALIGNING MEANS

[72] Inventors: Fujio Sato; Ko Homma, both of Tokyo, Japan

[73] Assignee: Akai Electric Company, Limited, Tokyo, Japan

[22] Filed: Sept. 9, 1970

[21] Appl. No.: 70,631

[30] Foreign Application Priority Data

| | | |
|---|---|---|
| Sept. 12, 1969 | Japan | 44/86667 |
| Oct. 29, 1969 | Japan | 44/102765 |
| Nov. 3, 1969 | Japan | 44/87854 |
| Dec. 4, 1969 | Japan | 44/115368 |
| Dec. 22, 1969 | Japan | 44/121692 |
| Feb. 6, 1970 | Japan | 45/12005 |

[52] U.S. Cl. ..............................179/100.2 C, 29/603

[51] Int. Cl. ..........G11b 5/22, G11b 5/28, G11b 5/40

[58] Field of Search ..........179/100.2 C; 340/174.1 F; 346/74 MC

[56] References Cited

UNITED STATES PATENTS

| | | | |
|---|---|---|---|
| 3,562,442 | 2/1971 | Pear | 179/100.2 C |
| 2,908,770 | 10/1959 | Warren | 179/100.2 C |
| 3,551,609 | 12/1970 | Libby et al. | 179/100.2 C |
| 3,249,700 | 5/1966 | Duinker et al. | 179/100.2 C |
| 3,145,452 | 8/1964 | Camras | 179/100.2 C |

*Primary Examiner*—Bernard Konick
*Assistant Examiner*—Alfred H. Eddleman
*Attorney*—Oblon, Fisher & Spivak

[57] ABSTRACT

A magnetic head has a front head portion which is adapted to engage with a rear head portion. The rear head portion consists of a plurality of U-shaped core portions, a shield plate and a holder therefor. The front head portion comprises a stacked arrangement which includes a plurality of core tips and a shield plate therebetween. The stacked arrangement is surrounded by transparent or semitransparent wear resistant members. When the front head portion is engaged to the rear head portion by a rectangular shaped frame through which the front head portion passes, a plurality of closed magnetic paths will be formed by the abutting of each of the U-shaped core portions with a given one of the core tips.

5 Claims, 5 Drawing Figures

INVENTORS
FUJIO SATO
KO HOMMA
BY
Oblon, Fisher & Spivak

EASILY ENGAGEABLE MAGNETIC HEAD WITH VISIBLE GAP ALIGNING MEANS

BACKGROUND OF THE INVENTION

1. Field of the Invention

This invention generally relates to a magnetic head for use in a tape recorder, and more particularly to a magnetic head which includes ring cores each of which has a core tip with a gap therein and a separately formed U-shaped core portion.

2. Description of the Prior Art

In the past, ring cores used in magnetic heads have been formed out of two U-shaped core sections which were divided in the direction of the legs of the cores. Each core section had a coil winding mounted thereon. The two separate core sections were bonded to each other by a suitable method of glass bonding and a gap was defined therebetween. While somewhat satisfactory, one of the problems with the prior art ring cores so formed was that in the process of glass bonding, often the insulation for a coil winding would be burnt by heat from the bonding temperature and thereby deteriorate. Another problem with the prior art ring cores was that it was difficult from a manufacturing point of view to wind a coil around a core which has already been formed as a ring.

When forming a multi-channel head according to the conventional techniques mentioned above, it has been found to be extremely difficult to align the core gaps along a common line. This, in turn, makes it difficult to obtain the same electrical characteristics for every channel of the head.

SUMMARY OF THE INVENTION

Accordingly, one object of the present invention is the provision of a new and improved unique magnetic head having ring cores therein.

Another object of this invention is to provide a new and improved magnetic head having ring cores therein, which includes a front head portion having core tips each with a gap therein and a rear head portion including a corresponding number of U-shaped core portions.

Still another object of this invention is to provide a new and improved unique magnetic head having uniform characteristics, such as frequency response and signal to noise ratio for each channel thereof. A further object of this invention is to provide a new and improved magnetic head which is wear resistant and dust free.

Yet another object of the present invention is to provide a new and improved magnetic head wherein visible means are provided for enabling each core gap to be aligned along a common line such that uniform characteristics are provided.

One other object of the present invention is to provide a new and improved magnetic head which is simple to construct and the coil windings of which are generally immune from damage, such as bonding heat, during the assembling thereof.

Briefly, these and other objects are in one aspect attained by the provision of a magnetic head which includes a front head portion having a plurality of core tips, each of which has a gap therein and a rear head portion having an identical number of U-shaped shaped core portions.

A rectangular shaped frame is provided for abutting and fixedly attaching the front head portion to the rear head portion such that a plurality of ring cores are thereby formed. Additionally, visible wear resistant members are provided enabling the gaps of the core tips to be readily aligned and shielding plates are provided for magnetically shielding the ring cores from each other.

BRIEF DESCRIPTION OF THE DRAWINGS

A more complete appreciation of the invention will become readily apparent as the same becomes better understood by reference to the following detailed description when considered in connection with the accompanying drawings, wherein.

DETAILED DESCRIPTION OF THE PREFERRED EMBODIMENT

Figures 1, 2, 3:
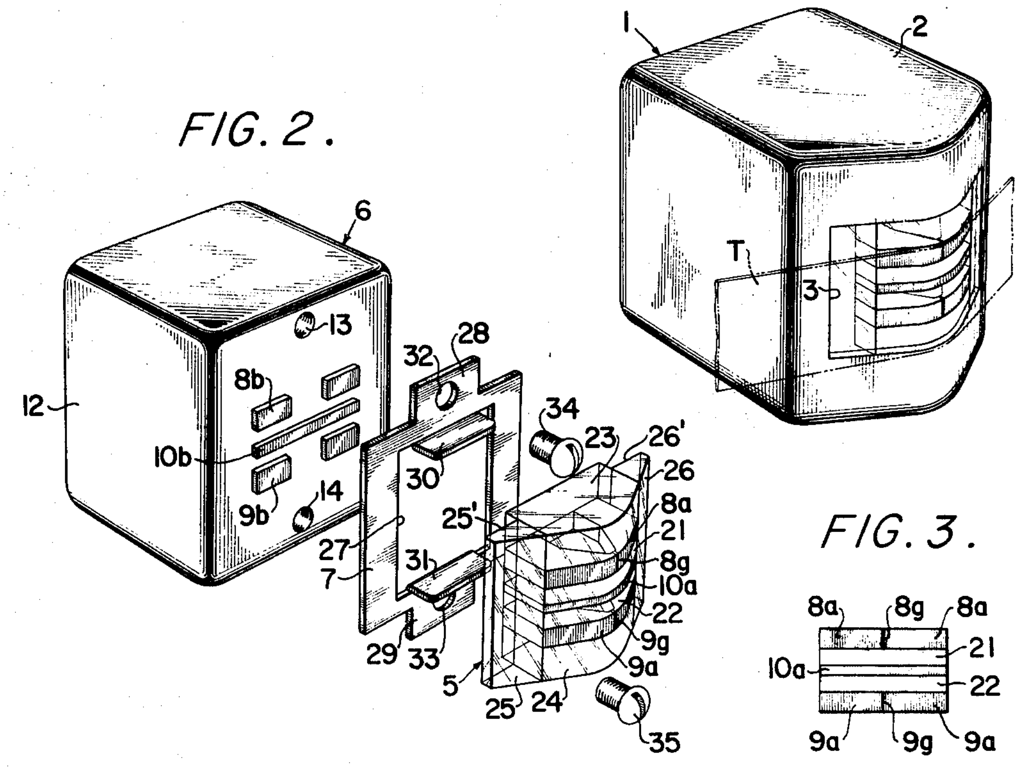
FIG. 1 is a perspective view of a completed magnetic head according to this invention.
FIG. 2 is an exploded perspective view of the magnetic head of FIG. 1 with its outer shield case removed.
FIG. 3 is an enlarged view of a part of the front half of the magnetic head.

Referring now to the Drawings, wherein like reference numerals designate identical or corresponding parts throughout the several views, and more particularly to FIG. 1 thereof, wherein a magnetic head 1 for effecting a recording and/or reproducing function in cooperation with a magnetic tape T according to the present invention is shown with the body of the magnetic head being exposed at a transparent or semi-transparent window 3 which is provided on a front face of an outer shield case housing 2.

The body of the magnetic head is shown in exploded form in FIG. 2 and includes a front head portion 5, a rear head portion 6, and a frame 7. The frame 7 is used for engaging the front head portion 5 with the rear head portion 6. The front head portion 5 is shown by way of example as including two magnetic core tips **8*a* and 9*a* having respective gaps 8*g* and 9*g*, a shielding plate 10*a* for magnetically shielding the core tips 8*a* and 9*a* from each other, and a plurality of wear resisting members for holding the core tips and shielding plate in a spaced relation. The rear head portion 6 is shown as having a core holder 12 of the box type and the same may be made, for example, of a non-magnetic material. A pair of U-shaped core portions 8*b* and 9*b* are provided and a leg of each is fixed to the front face of the holder 12. A shield plate 10*b* is also provided and fixed to the front face of the holder 12 and is used for magnetically shielding the U-shaped core portions 8*b* and 9*b* from each other. For reasons to be explained hereinafter, it should be noted that each of the U-shaped core portions 8*b* and 9*b* is held on the holder 12 only at the ends of both of the legs thereof. The arrangement of the U-shaped core portions 8*b* and 9 *b*** within said core holder 12 can be seen best by reference to FIG. 4. On the front face of the core holder 12 near the upper and lower portions thereof are provided tapped holes 13 and 14 for enabling engagement of the front head portion 5 with the rear head portion 6. It should further be understood that the front head portion 5 is aligned with the rear head portion 6 with the aid of the frame 7 in such a fashion as to form substantially closed magnetic paths.

From the above, it is clearly seen that the magnetic head according to this invention consists of front and rear portions and that a magnetic core is formed therein out of two separate core portions which are divided in a direction perpendicular to the legs thereof. More particularly, the magnetic core of the magnetic head is formed by the respective joinder of the core tips 8a and 9a with the U-shaped core portions 8b and 9b. It should also be understood that each of the core tips 8a and 9a comprises two members, each of which terminates in a narrow flat face. The flat faces of each of the core tips **8*a* and 9*a* define respective narrow nonmagnetic gaps 8*g* and 9*g* between the members thereof. It should be apparent that when the magnetic head of this invention is assembled a ring core having substantially closed magnetic paths will be formed by the respective alignment and joinder of the core tips 8a and 9a with the U-shaped core portions 9*b* and 9*b*. Thus, in accordance with the teachings of the present invention, it becomes possible to separately assemble the front head portion 5 and the rear head portion 6** of the magnetic head.

Figure 4:
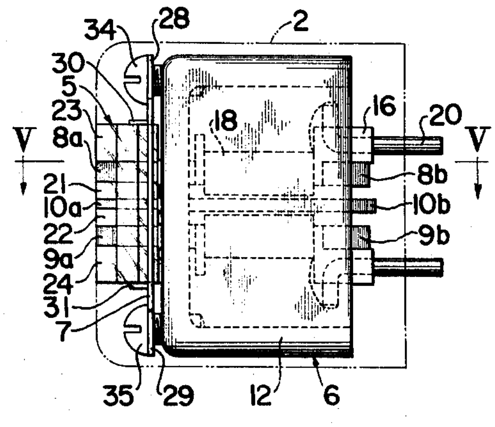
FIG. 4 is a side view of the magnetic head with its outer shield case removed; and, FIG. 5 is a horizontal sectional view of the magnetic head taken along the line V—V of FIG. 4 with its outer shield case removed.

When winding a coil around a core, it is quite advantageous that the core be divided into two portions in a direction perpendicular to the legs thereof. This is because it now becomes possible, as shown in FIG. 4, to wind coil windings 17 and 18 around respective bobbins 15 and 16 before the separate core portions of the magnetic ring core are joined. The windings 17 and 18 may be readily placed on the U-shaped core portion by simply placing the bobbins 15 and 16 on the legs of the U-shaped core portions. Likewise, the gaps, such as **8*g* and 9*g***, between the core tips can be separately formed by means, such, for example, as by glass bonding well in advance of the formation of the completed ring core. This enables the high temperature glass bonding to be performed out of the vicinity of the coil windings wound around the U-shaped core portions and thereby avoid the heretofore possibility of deteriorating the insulation of the coil windings which existed in the prior art. Moreover, the characteristics of the magnetic head of the present invention over that of the prior art are greatly improved due to the avoidance of high temperatures being applied to the winding areas.

In reference to FIG. 4, it can also be seen that the coil windings 17 and 18 are wound on both legs of the one U-shaped core portion **8*b* shown therein and that the same are electrically connected to each other and to terminals 19 and 20**.

Referring now again to FIG. 2, it can be seen that the core tips 8a and 9a of the front head portion 5 are spaced apart and parallel to each other by means of wear resistant members 21 and 22, such, for example, as being made of glass, plastic, or the like. A shield plate **10*a* is interposed between the wear resistant members 21 and 22. In the field of multi-channel magnetic heads, it is well known that the distances between the core members is very important with regard to the performance thereof. For this reason, the stacked structure set forth above and clearly seen with reference to FIG. 3 has been found to be most satisfactory. With the structure of FIG. 3, the outer surfaces of the wear resistant members 21 and 22 can be made so accurately that the two members, which constitute each of the core tips 8*a* and 9*a*, can be positioned on the same level thus enabling the distance between the core tips 8*a* and 9*a*** to be accurately determined. Thus, with the present invention, it therefore becomes possible to obtain a magnetic head which has a very accurate and constant distance between the cores of each and every channel provided. It should be understood that such an accurate construction will be effective in avoiding cross-talk between channels.

In FIG. 2, it is seen that the front head portion 5 also has wear resistant members 23 and 24 joined respectively on the upper surface of the core tip **8*a* and on the lower surface of the core tip 9*a*. Moreover, a pair of wear resistant members 25 and 26, preferably of glass, are provided and joined on the end surfaces of the stacked arrangement of the core tips 8*a* and 9*a*, the shield plate 10*a* and the wear resistant members 21, 22, 23, and 24. The depth of the lateral wear resistant members 25 and 26 is shallower than that of the stacked arrangement to which they are joined in order to provide a step 25′ and a step 26′ between the respective members 25 and 26 and the stacked arrangement. The steps 25′ and 26′ are effective in securing the front head portion 5 to the frame 7**, as set forth hereinafter.

It should be understood that it is very important in the art of multi-channel magnetic heads that all of the gaps of the cores be positioned on a common line perpendicular to the travelling direction of the tape. Also, it is important that the depth of all of the gaps be equal.

In this invention, the wear resistant members 23 and 24 which may, for example, be glass or plastic, can be transparent and being respectively positioned in contact with the upper surfaces of the core tip **8*a* and the lower surfaces of the core tip 9*a* enables the gaps of the cores to be clearly observed during the formation thereof and thereby enables the desired gap and depth to be obtained. This is an extremely important advantage, since in the past, it was difficult to accurately measure a core gap and as such, it was impossible to equalize the depth of all of the gaps in a single head. According to this invention, however, since the core depth can be directly measured, it becomes possible to produce the magnetic heads having uniform core characteristics. It should be understood from the above that the wear resistant members 23 and 24** may be alternatively semitransparent as long as the gap depth can be viewed therethrough during the formation thereof.

Likewise, the wear resistant members 25 and 26, which are disposed on both lateral sides of the front head portion 5, may be of a transparent or semitransparent nature and thereby serve to enhance the alignment of the core gaps. Thus, if there is no clearance between the lateral members 25 and 26 and the core tips 8a and 9a when the same are closely positioned on the end contact surfaces of the tips and in parallel thereto, a single interference fringe, which is formed by interference between a reflected light from the contact surface of the members 25 and 26 and a reflected light from that of the core tips **8*a* and 9*a***, is viewable. On the other hand, if there is any clearance between the resistant members and the tips due to an incompleteness of parallelism, a number of interference fringes, which are known as Newton Rings, are viewable. The color and the number of the Newton Rings will depend upon the extent of parallelism and hence closeness between the resistant members and the tips. By observing the interference fringes thus made, the incompleteness of parallelism or closeness can readily be determined. This feature is extremely helpful in aligning the respective gaps *8g* and *9g* of the core tips *8a* and *9a* in a direction perpendicular to that of the moving tape. It should be understood that the interference fringe will occur, since the gap in each core is separated the same distance from the end surface thereof and is precisely parallel therewith.

Figure 5:
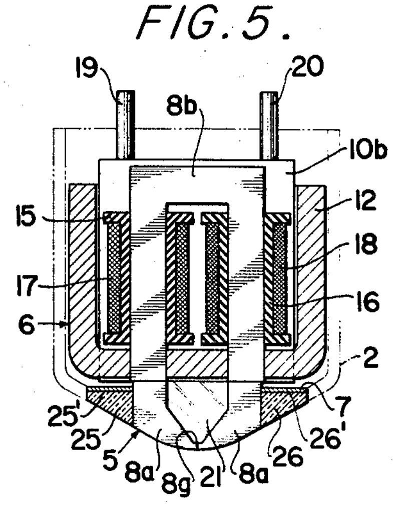

The frame 7 for engaging the front head portion 5 with the rear head portion 6 will now be described with reference to FIGURES 2 and 5.

In the magnetic head of the present invention, the front head portion 5 and the rear head portion 6 are arranged to abut one another. The frame 7 is used to achieve this butt engagement. This differs from the prior art where it was common practice to employ a lap engagement such that a single core was formed from two divided core sections. The lap engagement, while somewhat satisfactory, requires large space for engaging the core sections. Moreover, the extent of a lap engagement is not adjustable and an adhesive agent is needed between the core sections to be engaged. This is highly undesirable from an electrical characteristic point of view.

The engaging frame 7 according to this invention may be a metal plate such, for example, as beryllium-copper and is provided with a rectangular opening 27 at the center thereof for receiving the front head portion 5. The frame 7 includes projections 28 and 29, each of which extend outwardly from the opposite outer edges of the frame and two stoppers 30 and 31, each of which are upstanding on opposite edges of the opening 27 and perpendicular to the plane of the frame. The opening 27 is of a rectangular shape and has a breadthwise length a little shorter than that of the front head portion 5 and a lengthwise length which is equal to that of the front head portion 5, so that when the front head portion 5 is received within the opening 27, both of the lateral steps 25′ and 26′ will rest on the frame 7. The projections 28 and 29 of the frame 7 are respectively provided with holes 32 and 33 through which screws 34 and 35 are passed to engage the front head portion 5 with the rear head portion 6 in cooperation with the tapped holes 13 and 14 provided on the front face of the core holder 12. During assembly, the extent of engagement between the front and the read head portions 5 and 6 can be varied by adjusting the binding of the screws 34 and 35. It should be understood that while the frame 7 is illustrated in FIG. 2 with the projections 28 and 29 formed in a plane which includes the frame 7, that it may be possible to bend the projections either upward or downward from the plane of the frame in order to more effectively adjust the binding of the screws 34 and 35.

With the configuration for the frame 7 as set forth above, the core tips *8a* and *9a* will be resiliently engaged with the U-shaped core portions *8b* and *9b*. The engagement between the core tips 8a and 9a and the core portions *8b* and *9b* will remain unchanged independently of any thermal expansion or contraction of the members holding the head portions.

In putting together the magnetic head according to the present invention, the front head portion 5 after being assembled is fixed to the frame 7 with the aid of an adhesive agent applied to the steps 25′ and 26′. The screws 34 and 35, after being passed through the holes 32 and 33 provided on the projections 28 and 29, are then applied to the tapped holes 13 and 14 so that the front head portion 5 and the rear head portion 6 will abut one another. The stoppers 30 and 31 are effective in preventing the front head portion 5 from displacing either in an upward or a downward direction. The core tips *8a* and *9a* and the shield plate *10a*, which are held in the front head portion 5, are thereby securely engaged with the U-shaped core portions 8b and 9b and the shield plate *10b*, which are also held in the rear head portion 6 to form two ring cores and a shield plate.

The magnetic characteristics, such as permeability, of the ring cores thus formed can be changed by adjusting the binding of the screws 34 and 35. This permits the provision of a magnetic head having ring cores of uniform electrical characteristics. Since the mechanical support of the cores will also affect the magnetic characteristics thereof, the U-shaped core portions *8b* and *9b*, as previously explained, are held on the holder 12 only at the ends of the legs of the core portions.

Because of possible shear between the front and the rear head portions in the course of assembly, the engaging surfaces of the U-shaped core portions *8b* and *9b* and the shield plate *10b* are made larger than those of the core tips *8a* and *9a* and the shield plate *10a*. The shield case 2, as shown in FIG. 1, covers the magnetic head thus assembled and is joined thereto by means of an adhesive agent. The shield case 2 may be further joined to the magnetic head assembly by filling with a cement, such as of the epoxy resin type.

obviously, many modifications and variations of the present invention are possible in the light of the above teachings. It is therefore to be understood that within the scope of the teachings herein and the appended claims, the invention may be practiced otherwise than as specifically described.

What is claimed and desired to be secured by Letters Patent of the United States is:

1. A magnetic head comprising:

a front head portion including a plurality of core tips, each of which has a gap therein, and a pair of at least semi-transparent wear resistant members respectively arranged on the extreme outer surfaces of said core tips, said wear resistant members having a depth which is at least equal to the depth of the gap of said core tips;

a rear head portion including a plurality of U-shaped core portions and means for holding said U-shaped core portions, the number of said U-shaped core portions being equal to the number of said core tips; and a mechanical and resilient engaging means attached to one of said front head portion and said rear head portion for arranging said front head portion to resiliently abut said rear head portion whereby a plurality of closed magnetic paths, each of which includes one of said plurality of gaps, are formed.

2. A magnetic head as set forth in claim 1, wherein said front head portion further includes an additional pair of at least semi-transparent wear resistant members arranged on the leading and trailing sides of said core tips as viewed in the direction of tape travel.

3. A magnetic head as set forth in claim 2, wherein said front head portion still further includes a stacked structure positioned between said plurality of core tips; said stacked structure consisting of a shield plate for magnetically shielding said core tips and a pair of wear resistant members which are previously attached to both sides of said shield plate.

4. A magnetic head as set forth in claim 1, wherein said engaging means is provided with an opening for receiving said front head portion and includes two projections which extend outwardly from the opposite outer edges thereof, said projections serving to enable said rear portion to be fixedly engaged to said front head portion.

5. A magnetic head as set forth in claim 4, wherein said projections are bent in either an upward or a downward direction from the plane of said engaging means.

* * * * *